US012060826B2

(12) United States Patent
Jewhurst

(10) Patent No.: US 12,060,826 B2
(45) Date of Patent: Aug. 13, 2024

(54) CONTAINERISED GENERATOR SET WITH EXTERNAL UPWARDLY OPEN EXHAUST AIR DUCT

(71) Applicant: Caterpillar (NI) Limited, Larne (GB)

(72) Inventor: Graham Jewhurst, Belfast (GB)

(73) Assignee: Caterpillar (NI) Limited, Larne (GB)

( * ) Notice: Subject to any disclaimer, the term of this patent is extended or adjusted under 35 U.S.C. 154(b) by 509 days.

(21) Appl. No.: 17/263,054

(22) PCT Filed: Jul. 15, 2019

(86) PCT No.: PCT/EP2019/025236
§ 371 (c)(1),
(2) Date: Jan. 28, 2021

(87) PCT Pub. No.: WO2020/020489
PCT Pub. Date: Jan. 30, 2020

(65) Prior Publication Data

US 2021/0239038 A1 Aug. 5, 2021

(30) Foreign Application Priority Data

Jul. 23, 2018 (GB) ...................................... 1812003

(51) Int. Cl.
*F02B 63/04* (2006.01)
*B65D 88/12* (2006.01)
*F01P 1/00* (2006.01)

(52) U.S. Cl.
CPC .............. *F02B 63/048* (2013.01); *F01P 1/00* (2013.01); *B65D 88/121* (2013.01); *F01P 2001/005* (2013.01); *F02B 2063/045* (2013.01)

(58) Field of Classification Search
CPC .. B65D 88/121; E04H 2001/1283; F01P 1/00; F01P 2001/005; F02B 2063/045; F02B 63/044; F02B 63/048
(Continued)

(56) References Cited

U.S. PATENT DOCUMENTS 4,098,077 A * 7/1978 Edmaier .................. F16M 3/00
60/272
5,550,333 A 8/1996 Whiteman, Jr.
(Continued)

FOREIGN PATENT DOCUMENTS

CN 104061069 A 9/2014
CN 106014635 10/2016
(Continued)

OTHER PUBLICATIONS

International Search Report related to Application No. PCT/EP2019/025236 reported on Sep. 30, 2018.
(Continued)

*Primary Examiner* — Tulsidas C Patel
*Assistant Examiner* — S. Mikailoff

(57) ABSTRACT

A containerised generator set comprises a generator arranged within a container having a first aperture through which cooling air is exhausted in use. A pair of first doors are arranged to pivot outwardly on either side of the first aperture, with a removable wall being removably mounted between the first doors and spaced apart from the body of the container by the first doors from its lower end region to its tipper end region in its mounted position. The removable wall and the first doors define an exhaust air duct which preferably includes a sound absorbent material. The exhaust air duct extends for at least most of a total height of the body of the container to attenuate noise from the generator. Exhausted cooling air flows upwardly from the open upper end of the exhaust air duct and away from the immediate operating environment.

9 Claims, 5 Drawing Sheets

(58) Field of Classification Search
USPC .................................................. 290/1 A, 1 R
See application file for complete search history.

(56) References Cited

U.S. PATENT DOCUMENTS

| | | | | |
|---|---|---|---|---|
| 7,081,682 | B2 | 7/2006 | Campion | |
| 7,795,745 | B2 | 9/2010 | Mellon et al. | |
| 8,555,824 | B2 | 10/2013 | Lobsiger | |
| 9,957,708 | B2 * | 5/2018 | Brewer | B65D 90/0086 |
| 2014/0090312 | A1 * | 4/2014 | Medley | E04B 1/3444<br>52/79.5 |
| 2016/0273211 | A1 * | 9/2016 | Brewer | H02K 7/1807 |
| 2016/0369689 | A1 | 12/2016 | Brewer et al. | |
| 2017/0314256 | A1 | 11/2017 | Klein | |

FOREIGN PATENT DOCUMENTS

| | | | |
|---|---|---|---|
| CN | 205945312 | | 2/2017 |
| CN | 107532507 | | 1/2018 |
| CN | 207620915 | | 7/2018 |
| JP | 2007-278136 | A | 10/2007 |
| WO | WO 2007/033498 | A1 | 3/2007 |

OTHER PUBLICATIONS

Great Britain Search Report related to Application No. GB1812003.0 completed on Jan. 14, 2019.

* cited by examiner

CONTAINERISED GENERATOR SET WITH EXTERNAL UPWARDLY OPEN EXHAUST AIR DUCT

CROSS-REFERENCE TO RELATED APPLICATIONS

This Application is a 35 USC § 371 US National Stage filing of International Application No. PCT/EP2019/025236 filed on Jul. 15, 2019 which claims priority under the Paris Convention to GB Patent Application No. 1812003.0 filed on Jul. 23, 2018.

TECHNICAL FIELD

This invention relates to containerised generator sets.

BACKGROUND

A containerised generator set comprises a generator mounted inside a container. Typically the container is an intermodal container, which is to say, a rigid, stackable container having a body configured as a rectangular cuboid and having standardised dimensions and load carrying capacity with standardised corner fittings connected by corner posts, allowing a predefined number of such containers to be stacked in a fully laden condition for sea transportation and then lifted by their corner fittings for onward transportation by road or rail.

Intermodal containers are often referred to as shipping containers or ISO containers, reflecting the international standards to which they are manufactured, for example, ISO 1161 which governs the corner fittings.

Containerised generator sets are often used as a temporary or backup turnkey power supply. The container can be transported and installed with minimal on-site preparation and also helps to contain the noise of the generator so as to provide a safe and acceptable enclosure when positioned close to buildings or pedestrian trafficked areas.

The cost and logistical constraints (e.g. ease of access issues) associated with transporting an intermodal container depend principally on its dimensions rather than its weight. Thus, it is desirable to maximise the size (hence, output) of the generator installed in any given size of container, so that more power can be delivered for the same cost.

Typically the generator will comprise an alternator driven by an internal combustion engine with a cooling system which draws ambient air into the container via an air intake and exhausts the heated air through an exhaust outlet.

Various measures have been proposed to reduce the noise emitted from the air exhaust outlet so as to reduce the impact of the generator on people nearby.

For example, CN104061069A discloses a containerised generator set wherein the interior of the container is divided into an air exhausting anechoic chamber, a diesel generator set chamber, an air inlet anechoic chamber and a fuel tank chamber. Air is exhausted via louvres in the doors of the container.

US2016273211 (A1) discloses a containerised generator set having an end wall with a cut-out. A door is hinged at a lower edge of the cut-out to form an angled exhaust duct for the superolateral expulsion of hot air from the radiator. The exhaust air duct allows several such containers to be stacked in use.

SUMMARY OF THE INVENTION

In a first aspect the present disclosure provides a containerised generator set as defined in the claims.

The containerised generator set includes a container and a generator, the container including a body and a pair of first doors. In a normal use position of the container, the body defines horizontal length and breadth dimensions and a vertical height dimension, and includes: a base extending in the length and breadth dimensions and defining a floor of an interior space of the body; a roof spaced apart from the base in the height dimension and extending in the length dimension between opposite, first and second ends of the body; and a pair of first and second sidewalls spaced apart in the breadth dimension, each of the sidewalls extending in the length dimension between the opposite ends of the body and in the height dimension between the base and the roof. The generator is arranged within the interior space of the body to exhaust cooling air via a first aperture at the first end or first sidewall of the body.

The first doors are pivotably connected to the body for pivotal movement between a closed position and an open position, wherein in the closed position the first doors close the first aperture, and in the open position the first doors extend outwardly in the length or breadth dimension away from said respective one of the first end and first sidewall of the body on either side of the first aperture.

The container further includes a removable wall, the removable wall being removably mountable in a mounted position between the first doors, in the open position of the first doors, to define between the removable wall, the first doors and the respective, first end or first sidewall of the body an upwardly open exhaust air duct external to the body. The exhaust air duct extends in the height dimension from a lower end region of the removable wall to an upper end region of the removable wall for at least most of a total height of the body. The removable wall is spaced apart from the body by the first doors from its lower end region to its upper end region in its mounted position.

In a second, related aspect the disclosure provides a method of operating a generator as defined in the claims.

In accordance with the method, a containerised generator set is arranged as described above and the exhausted cooling air is discharged upwardly from an upper end of the exhaust air duct.

BRIEF DESCRIPTION OF THE DRAWINGS

Further features and advantages will become apparent from the illustrative embodiments which will now be described, purely by way of example and without limitation to the scope of the claims, and with reference to the accompanying drawings, in which:

Reference numerals or characters appearing in more than one of the figures indicate the same or corresponding elements in each of them.

DETAILED DESCRIPTION

Figure 1:
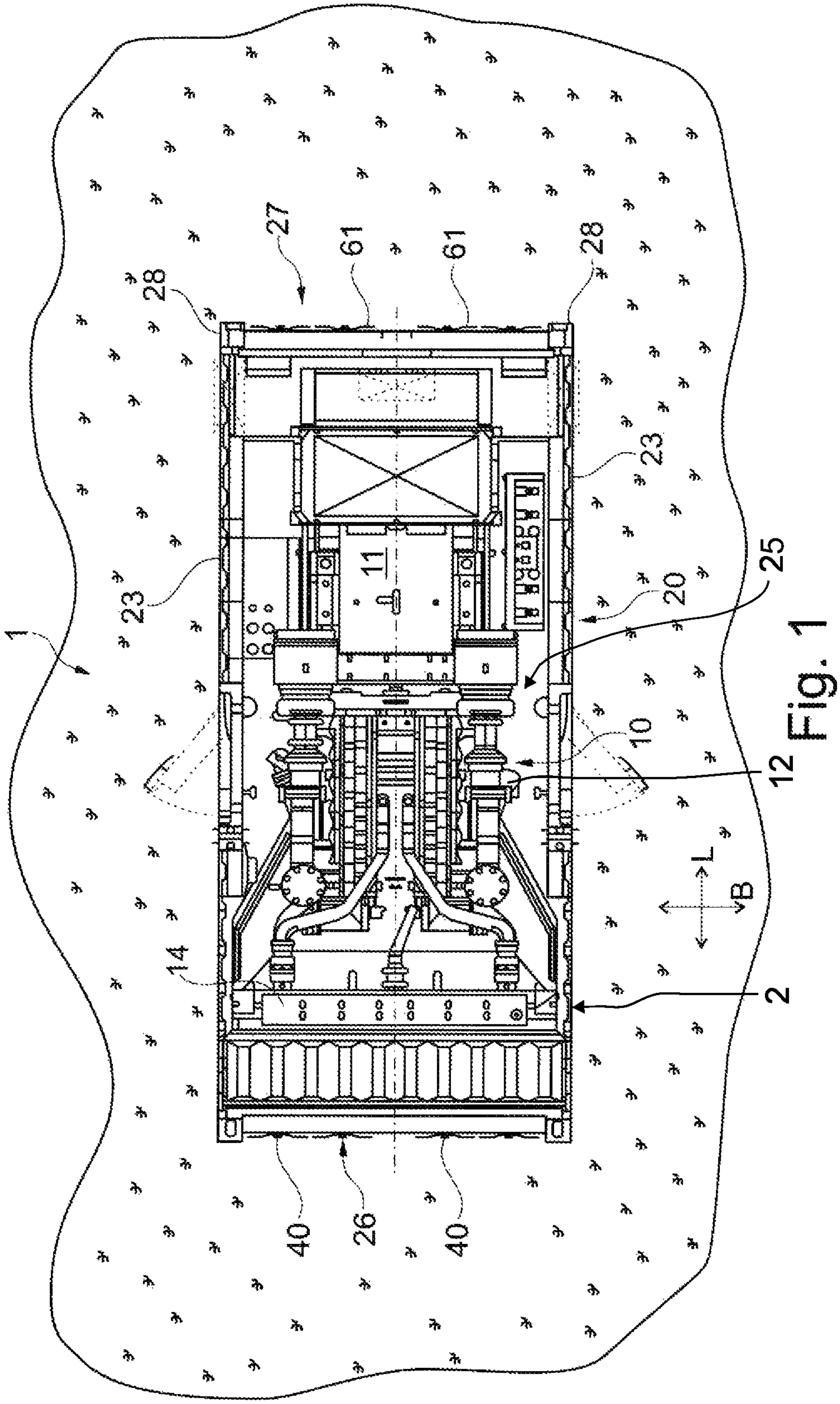
FIG. 1 is a plan view of a containerised generator set (hereinafter referred to as the "set") in a transit configuration, with the roof cut away to show the generator inside the container body.
Figure 2:
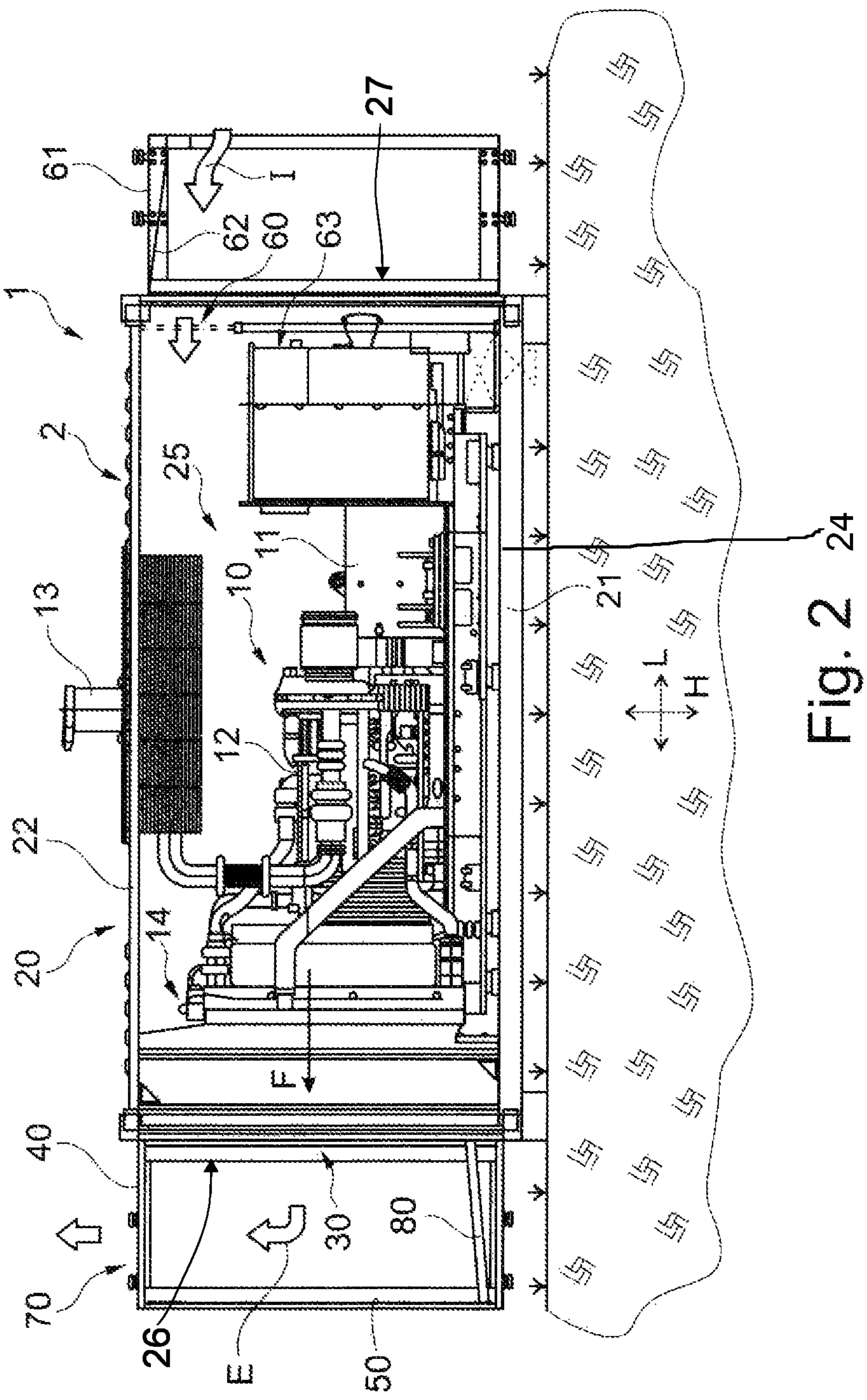
FIG. 2 is a side view of the set in a use configuration, with the sidewall cut away to show the generator inside the container body.

Referring to FIGS. 1 and 2, a containerised generator set ("the set") 1 includes a container 2 and a generator 10. The generator may be any arrangement for generating electric power, but typically will comprise an electrical generating unit 11 such as an alternator or dynamo driven by a prime mover 12, usually an internal combustion engine as illustrated.

The container 2 includes a body 20, which typically will be rigid and will define a rectangular cuboid, as shown. In a normal, upright use position of the container the body defines a horizontal length dimension L, a horizontal breadth (width) dimension B, and a vertical height dimension H.

The body 20 includes a base 21, a roof 22, and a pair of first and second sidewalls 23. The base extends in the length and breadth dimensions with its upper surface defining a floor 24 of an interior space 25 of the body. The roof 22 is spaced apart from the base 21 in the height dimension and extends in the length dimension between opposite, first and second ends 26, 27 of the body. The sidewalls 23 are spaced apart in the breadth dimension, each of the sidewalls extending in the length dimension between the opposite ends 26, 27 of the body 20 and in the height dimension between the base 21 and the roof 22.

In the illustrated example, the container 2 is an intermodal container, with standard corner fittings 28 connected by corner posts 29. Intermodal containers are configured in a range of standard sizes, having a width of 8' (2.4 m), a height of 8' 6" or 9' 6" (2.6 m or 2.9 m), and a length, most commonly of either 20' (as shown) or 40' (6.1 m or 12.2 m), although longer and shorter variants are available.

In this specification, the term "length" refers to the horizontal axis of the container which extends in the longitudinal direction of the sidewalls. In an intermodal container the length dimension will usually be longer than the breadth dimension. However, containers are available in diverse configurations, and it is possible for a container to be longer in the breadth dimension than the length dimension.

The generator 10 is arranged within the interior space 25 of the body to exhaust cooling air E via a first aperture 30 at the first end 26 or first sidewall 23 of the body. In the illustrated example, the first aperture 30 is formed at the first end 26 which is closed by a pair of first doors 40.

Figure 4:
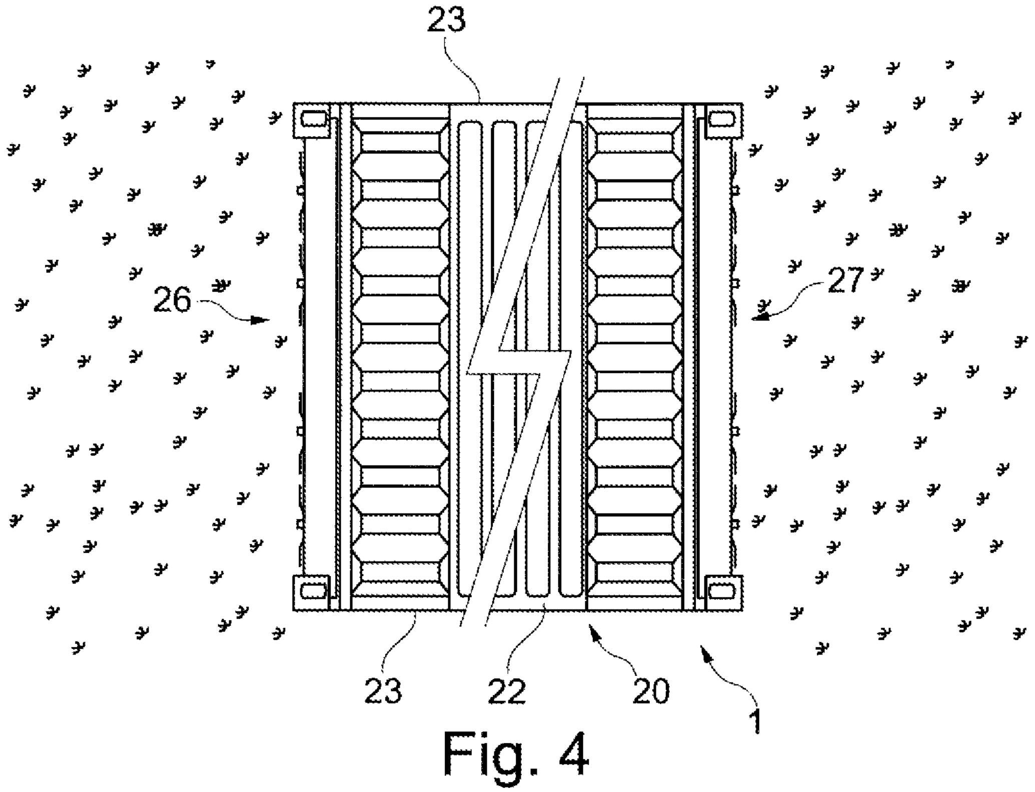
FIGS. 4-7 show the set in plan view, illustrating respectively four consecutive steps in the configuration of the set from its transit configuration (FIG. 4) to its use configuration (FIG. 7).
Figure 5:
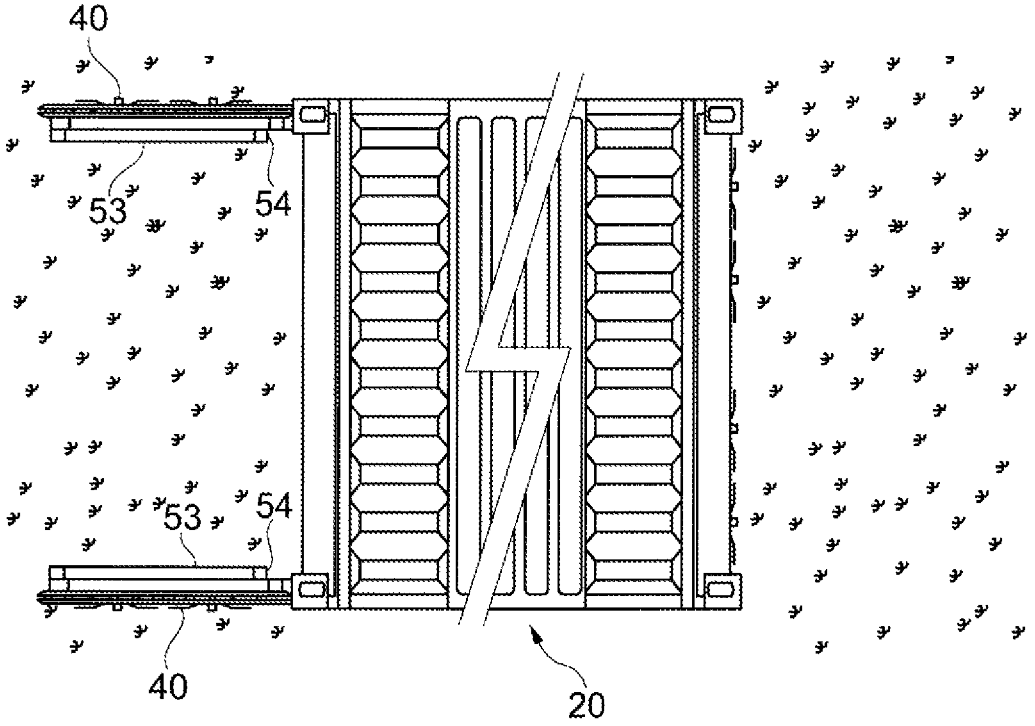

Each of the first doors 40 is pivotably connected to the body 20 by a hinge for pivotal movement (preferably about a vertical axis) between a closed position (as shown in FIGS. 1 and 4) and an open position (as shown in FIGS. 2 and 5). In the closed position the first doors 40 close the first aperture 30, and in the open position the first doors 40 extend outwardly in the length dimension away from the first end 26 of the body on either side of the first aperture 30.

Advantageously, each of the first doors 40 may be pivotably connected by hinges to the first end 26 of the body at an end of a respective one of the first and second sidewalls 23, so that in their open position the first doors 40 are spaced apart by substantially the width of the body 20. Conveniently as shown, the first doors 40 may comprise the conventional end doors of the intermodal container so that each door is hinged to the body at a respective corner post 29. The end doors thus define an outer surface of the exhaust air duct in the use configuration, as further explained below. This provides a particularly strong, simple and cost effective construction with a conveniently simple, rectangular footprint in the use configuration while maximising the width and section area of the exhaust air duct.

Figure 7:
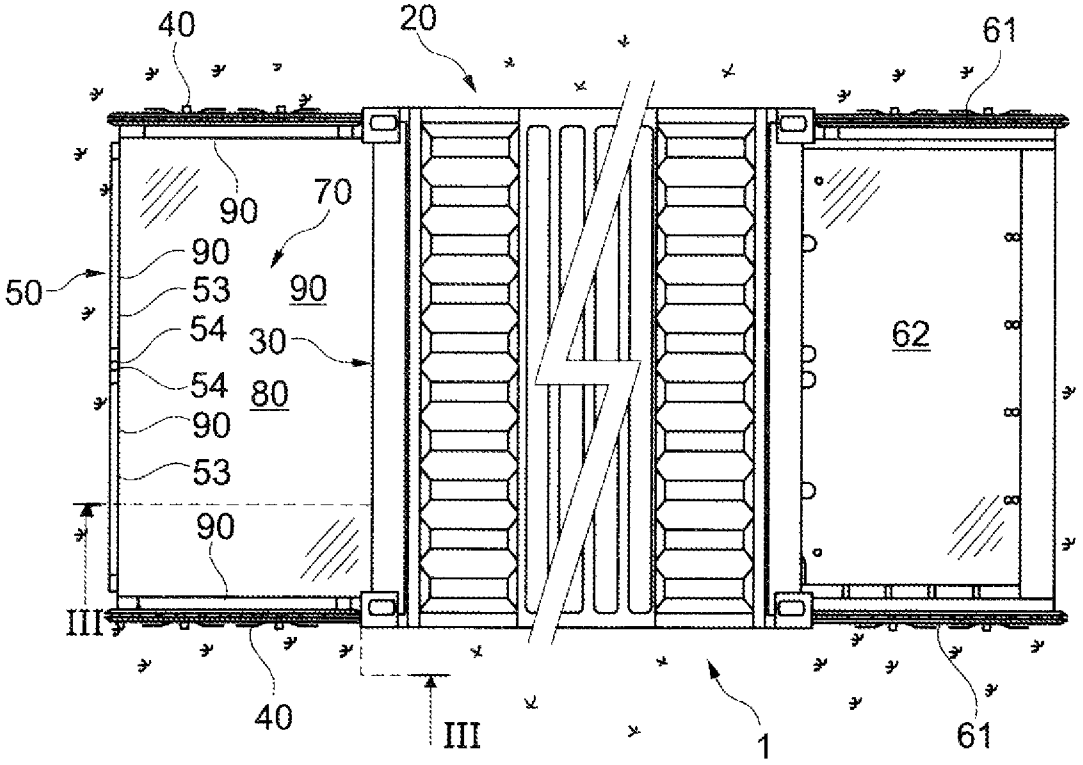

The second end 27 of the body may define a second aperture 60 which is closed by a second door or pair of doors 61, which may also comprise conventional end doors of the intermodal container 2, as shown. With the second doors 61 open, a hinged rain cover 62 may be pivoted outwardly from the body 20 and connected to the open second doors 61 to form a small shelter which is protected at the sides by the second doors 61 and above by the rain cover 62, as shown in FIG. 2 and FIG. 7.

The second aperture 60 defines an air inlet through which in use, fresh air I is drawn in via the shelter beneath the rain cover 62. The shelter also provides access to a control panel 63 for controlling the operation of the generator. Other air flowpath configurations may be adopted; however, it is convenient to provide the air inlet and exhaust air outlet at opposite ends of the body so as to avoid recirculation of the cooling air through the generator set.

In use, the engine 12 consumes a part of the air flowing in through the air inlet and exhausts it via an engine exhaust outlet 13 which may be arranged to project upwardly above the body 20, as shown.

The rest of the air is drawn by fans (not shown) through the generating unit 11 and past the engine 12 to flow through the cooling system of the generator, comprising a heat exchanger 14 which defines a heat exchange flowpath through which the cooling air flows in a flow direction F.

The heat exchanger will typically be configured as a conventional radiator having a matrix defining numerous apertures, so that the total section area of the heat exchange flowpath normal to the flow direction F will be defined by the combined section area of the apertures.

The cooling air is heated in the heat exchanger 14 and then exhausted via the first aperture 30 in the first end 26 of the body.

Referring now also to FIGS. 3-7, the set 1 is delivered to the site in its transit configuration with the first and second doors 40, 61 closed as shown in FIG. 4.

The first doors 40 are then pivoted outwardly to the open position (FIG. 5).

Figure 6:
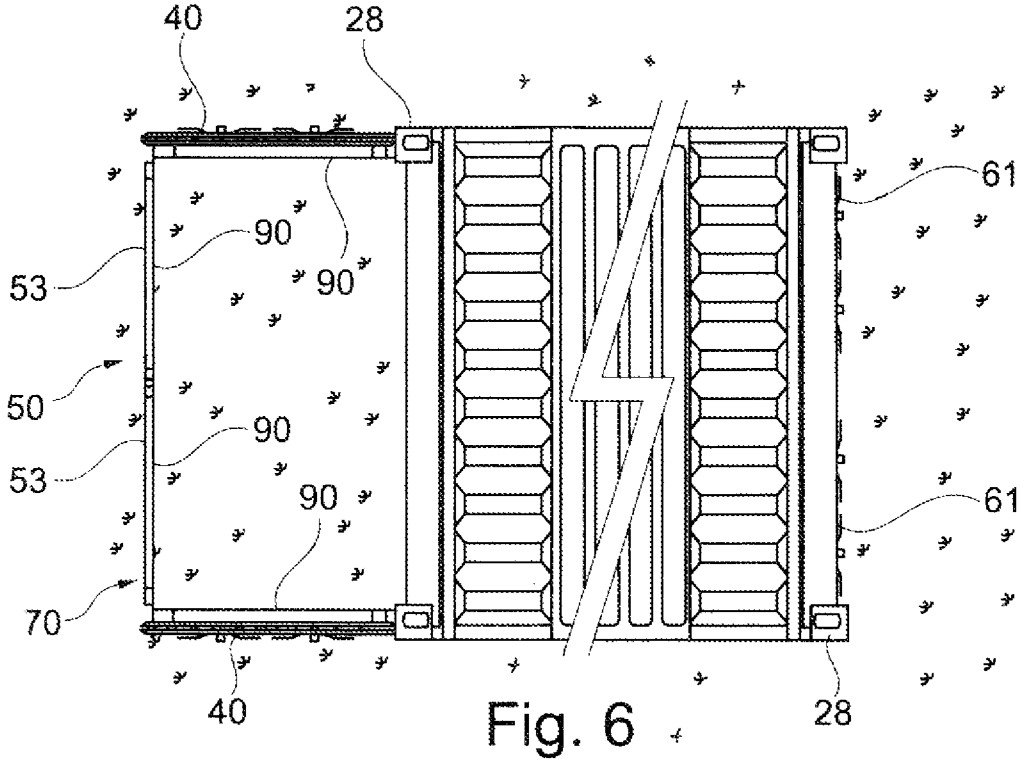

A removable wall 50 is then removably mounted in a mounted position between the first doors, in the open position of the first doors, to define between the removable wall 50, the first doors 40 and the first end 26 of the body 20 an upwardly open exhaust air duct 70 external to the body, as shown in FIG. 6.

Figure 3:
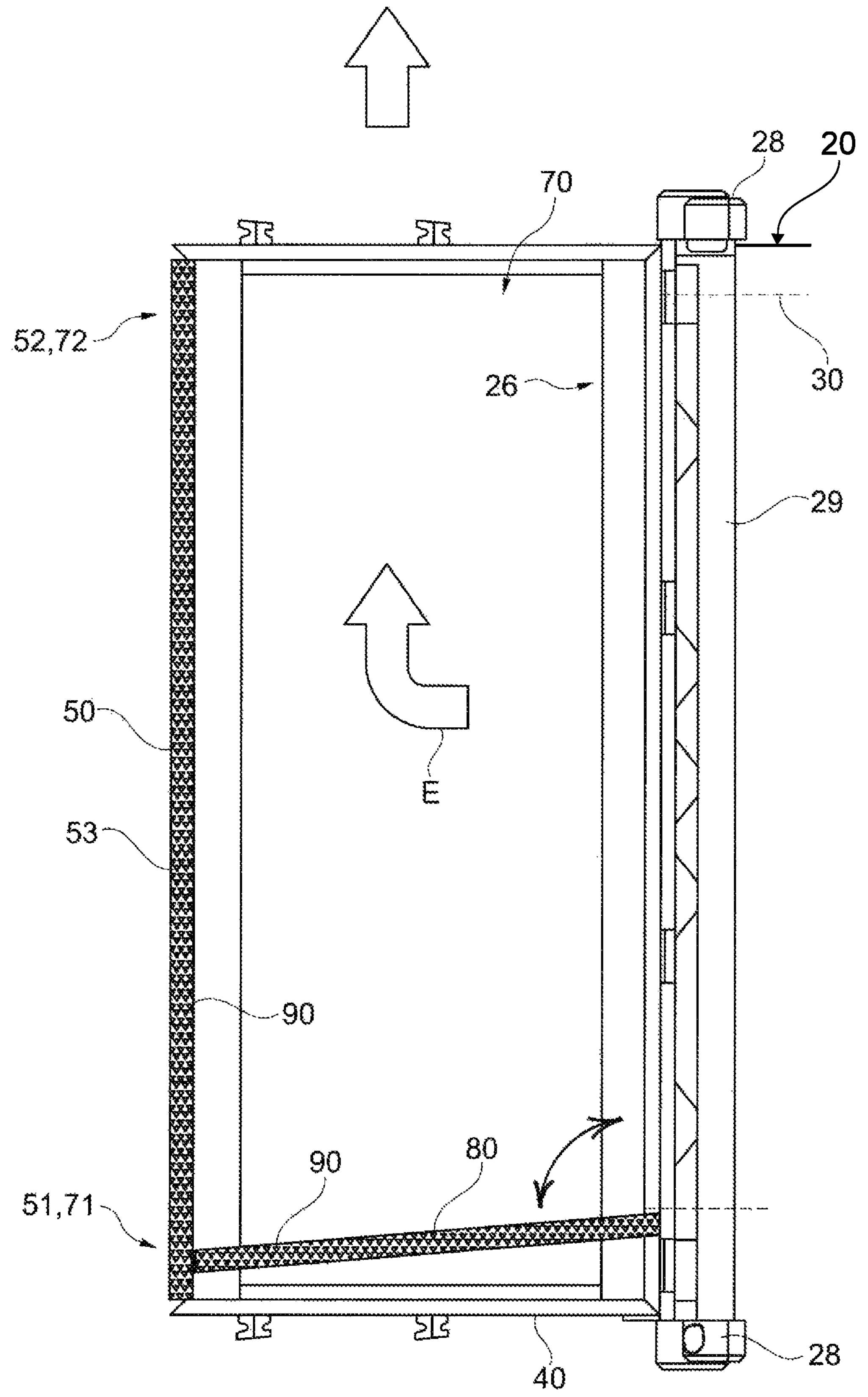
FIG. 3 is an enlarged side view of one end region of the set as shown in FIG. 2, with the exhaust air duct sectioned at III-III of FIG. 7.

Referring to FIGS. 2 and 3, it can be seen that the removable wall 50 is spaced apart from the body 20 by the first doors 40 from the lower end region 51 of the removable wall to the upper end region 52 of the removable wall in its mounted position.

Preferably, as illustrated, the removable wall 50 is substantially vertical in its mounted position in the upright, normal use position of the container. As further exemplified by the illustrated embodiment, the exhaust air duct 70 may define a substantially rectangular internal horizontal section, forming the final flowpath for the exhaust cooling air, from the lower end region 71 of the exhaust air duct to the upper end region 72 of the exhaust air duct.

The exhaust air duct 70 defines a minimum internal horizontal section area from its lower end region 71 to its upper end region 72, which can be seen as the rectangular area visible in plan view in FIG. 6 and covered by the base panel 80 in FIG. 7. The minimum internal horizontal section area may be greater than the section area of the heat exchange flowpath, so that the cooling air slows down as it enters the exhaust air duct 70.

The exhaust air duct 70 extends in the height dimension H from the lower end region 51 of the removable wall 50 to the upper end region 52 of the removable wall 50 for at least most of a total height of the body 20, and may extend substantially from the base 21 to the roof 22, as exemplified by the illustrated embodiment in which its height corresponds to the height of the conventional doors of the intermodal container.

The exhaust air duct 70 may extend between the first doors 40 for at least most of a total breadth of the container body 20 in the breadth dimension B, and advantageously for substantially the total breadth of the body 20 as shown.

The removable wall 50 is removable in the sense that it can be removed from its mounted position to a storage or transit position. For ease of assembly, the removable wall 50 may be movable but not detachable from the container 2, although it could alternative be detachable. In either case, the removable wall 50 may conveniently be arranged inside the container 2 in its transit configuration so that the entire set 1 can be shipped as a single unit.

The removable wall may comprise at least two panels 53, the panels 53 being hingedly connected respectively to the first doors 40. As exemplified by the illustrated embodiment, two panels 53 may be hinged respectively to the opening distal edges of the first doors 40 which lie on the longitudinal central axis of the container in the closed position (so, opposite their proximal edges at which they are hinged to the body 20). The panels 53 fold back against the inner surfaces of the first doors 40 so that they are contained inside the container 2 in the transit configuration of the set 1, and fold out to form the removable wall 50 in the use configuration, in which they may be connected together by suitable fasteners (not shown) at their abutting, distal edges 54.

A base panel 80 may be removably mountable in a mounted position to close a lower end of the exhaust air duct 70. Conveniently, the base panel 80 may be arranged to mechanically engage one or more of the first doors 40 and the removable wall 50 or panels 53 to restrain the first doors and the removable wall in a rigid configuration, as shown in FIGS. 2, 3 and 7. The base panel 80 may be detachable and storable within the body 20, or may be hinged to the body 20 to pivot as indicated by the arrow in FIG. 3 so as to fold away inside the container body in the transit configuration.

The base panel 80 may be arranged in its mounted position to slope downwardly and outwardly away from the body 20 in the normal use position of the container, as best seen in FIGS. 2 and 3, so that rain entering the open, upper end of the exhaust air duct 70 can drain away from the body 20.

In use, the generator is operated so that the cooling air is exhausted from the first aperture 30 into the exhaust air duct 70 and then is discharged upwardly, preferably substantially vertically upwardly, from the open upper end of the exhaust air duct.

The exhausted cooling air may enter the exhaust air duct 70 at an angle normal or oblique to its vertical axis, and then change direction as it impinges on the internal surface of the exhaust air duct, as illustrated by the exhaust air arrows E in FIG. 3.

The first and second doors 40, 61 and the roof and sidewalls 22, 23 may be made from metal, typically steel sheet or plate. The first wall 50 or panels 53 and base panel 80 may be made from the same or a different metal, e.g. steel or aluminium.

When considered in plan view as shown in FIG. 7, the in-use footprint of the container is enlarged by the ground area covered by the exhaust air duct 70 external to the container body 20, relative to its smaller footprint in the transit configuration as shown in FIG. 4. The height of the exhaust air duct is selected so that the removable wall 50 and the first doors 40 form a barrier to segregate the first aperture 30 and the flow of exhaust air E from the ground level environment external to the enlarged footprint of the container. The barrier directs the flow of exhaust air E upwardly away from the immediate ground level environment and attenuates noise emitted from the generator set via the first aperture 30.

Particularly good sound attenuation is obtained by providing the exhaust air duct with a sound absorbent material 90, which may be configured as a lining to cover some or, preferably, most or all of the internal surface area of the exhaust air duct 70. In this specification, a sound absorbent material means a material which attenuates sound substantially more effectively than the conventional steel sheet or plate which forms the sides and end doors of a conventional intermodal container (which generally is around 2 mm in thickness). A conventional sound absorbent material may be selected as well known in the art, including for example soft or fibrous or cellular or heavy materials, optionally including a surface layer and one or more substrate layers to provide a suitably cleanable and water resistant surface, fire resistance, and other required characteristics.

In the illustrated example, a sound absorbent material 90 is arranged as a lining to cover the internal surfaces (i.e. the surfaces defining the inner flowpath of the exhaust air duct) of the first doors 40, the removable wall 50 comprising its component panels 53, and the base panel 80, wherein each of the first doors 40, optionally also the panels 53 and/or the base panel 80, comprises an outer skin of metal sheet or plate.

INDUSTRIAL APPLICABILITY

The novel arrangement may be applied to containerised generator sets of any size.

The configuration of the first doors 40 and the removable wall 50 maximises the internal horizontal section area of the exhaust air duct 70 from its lower end region to its upper end region, so that the cooling air exhausted from the first aperture can move upwardly from the lower end region to the upper end region of the exhaust air duct at relatively low speed. The height of the exhaust air duct 70 guides the exhaust air E so that it flows out from the open, upper end of the exhaust air duct in a generally upward rather than outward direction.

The configuration of the first doors 40 and the removable wall 50 moreover makes it possible to form the exhaust air duct 70 with a relatively large horizontal section area from its lower end region 71 to its upper end region 72, which may be larger than the section area of the heat exchange flowpath. A particularly large section area can be obtained by connecting the first doors 40 at the ends of the sidewalls 23 in the conventional position for the end doors of an intermodal container.

The airflow can thus move upwardly through the exhaust air duct 70 as a relatively voluminous and relatively low speed flow, which may be relatively slower than the speed of the flow of cooling air through the heat exchange flowpath. The removable wall 50 may be substantially vertical in its mounted position and may be arranged opposite the first aperture 30, as exemplified by the illustrated embodiment, so that the exhausted air E impinges on the removable wall 50 and is guided vertically upwardly by the interior surface of the exhaust air duct 70 formed by the removable wall. The relatively low speed flow causes the air to move vertically upwardly with relatively little energy, guided by the vertical surfaces of the exhaust air duct, so that as it flows out of the upper end of the exhaust air duct it tends to flow mostly upwardly rather than outwardly beyond the enlarged plan area footprint of the container. The set 1 can thus be located close to buildings and pedestrian areas without inconveniencing people in its immediate vicinity.

Since the airflow is able to flow relatively slowly upwardly through the exhaust air duct, the noise emanating from the cooling system, including the noise generated by the air impinging on the inner surface of the exhaust air duct 70, is limited or reduced, particularly where the exhaust air duct includes a sound absorbent material 90.

The substantial height of the exhaust air duct 70 thus allows it to attenuate noise, obviating the need to arrange a sound absorbing chamber inside the body 20 of the container 2. This in turn allows a relatively larger and more powerful generating set to be contained within the footprint of any given standard size of container in its transit configuration.

In a particularly convenient arrangement, all the components of the exhaust air duct may be arranged (e.g. by folding) inside the container body 20 in its transit configuration so that the set 1 can be shipped together with all its components as an integral unit.

In summary, a containerised generator set 1 comprises a generator 10 arranged within a container 2 having a first aperture 30 through which cooling air E is exhausted in use. A pair of first doors 40 are arranged to pivot outwardly on either side of the first aperture 30, with a removable wall 50 being removably mounted between the first doors and spaced apart from the body 20 of the container 2 by the first doors 40 from its lower end region 51 to its upper end region 52 in its mounted position. The removable wall 50 and the first doors 40 define an exhaust air duct 70 which preferably includes a sound absorbent material 90. The exhaust air duct 70 extends for at least most of a total height of the body 20 of the container to attenuate noise from the generator 10. Exhausted cooling air E flows upwardly from the open upper end of the exhaust air duct 70 and away from the immediate operating environment.

In alternative embodiments, the first aperture 30 and first doors 40 may be arranged instead at the first sidewall 23 so that in the open position the first doors extend away from the first sidewall in the breadth dimension, with the exhaust air duct being defined between the first doors, the removable wall and the first sidewall.

The container need not be an intermodal container.

Many further adaptations are possible within the scope of the claims.

In the claims, reference numerals or characters in parentheses are provided purely for ease of reference, and should not be construed as limiting features.

The invention claimed is:

1. A containerised generator set including:
a container, and
a generator;
the container including:
a body, and
a pair of first doors;
wherein, in a normal use position of the container, the body defines horizontal length and breadth dimensions and a vertical height dimension, and the body includes:
a base extending in the length and breadth dimensions and defining a floor of an interior space of the body;
a roof spaced apart from the base in the height dimension, the roof extending in the length dimension between a first end and a second end of the body; and
a first sidewall and a second sidewall spaced apart from each other in the breadth dimension, each of the sidewalls extending in the length dimension between the first and second ends of the body and each of the sidewalls extending in the height dimension between the base and the roof,
the generator being arranged within the interior space of the body to exhaust cooling air from the generator via a first aperture at the first end or the first sidewall of the body;
the first doors being pivotably connected to the body for pivotal movement between a closed position and an open position, wherein in the closed position the first doors close the first aperture, and in the open position the first doors extend outwardly on either side of the first aperture, in the length dimension or in the breadth dimension, away from one of the first end and the first sidewall of the body;
the container further including a movable wall, the movable wall being mountable in a wall mounted position between the first doors, when the first doors are in the open position, to define an upwardly open exhaust air duct external to the body, the upwardly open exhaust air duct is defined between the movable wall, the first doors, and either the first end or the first sidewall of the body;
the exhaust air duct includes a base panel, the base panel being movably mountable in a base mounted position to close a lower end of the exhaust air duct, the base mounted position is arranged to slope downwardly and outwardly away from the body in the normal use position of the container and the base mounted position configured to drain rain away from the body;
the exhaust air duct extending in the height dimension from a lower end region of the movable wall to an upper end region of the movable wall for a height of the body;
the movable wall being spaced apart from the body by the first doors from the lower end region to the upper end region in the wall mounted position.

2. The containerised generator set according to claim 1, wherein the first aperture is formed at the first end of the body, and the first doors are arranged to extend outwardly in the length dimension away from the first end of the body in the open position.

3. The containerised generator set according to claim 2, wherein each of the first doors is pivotably connected to the body at an end of a respective one of the first and second sidewalls.

4. The containerised generator set according to claim 1, further comprising a sound absorbent material in the exhaust air duct, the sound absorbent material being arranged as a lining to cover internal surfaces of the exhaust air duct.

5. The containerised generator set according to claim 1, wherein the exhaust air duct extends in the height dimension from the base to the roof.

6. The containerised generator set according to claim 1, wherein the base panel is arranged to mechanically engage one or more of the first doors and the movable wall to maintain the first doors and the movable wall in a rigid configuration.

7. The containerised generator set according to claim 6, wherein in the normal use position of the container, the base mounted position slopes downwardly and outwardly away from the body.

8. The containerised generator set according to claim 1, wherein the movable wall comprises at least two panels, the panels being hingedly connected to the first doors.

9. A method of operating a generator, the method comprising:

providing a containerised generator set including:

a container, and the generator;

the container including:

a body, and a pair of first doors;

wherein, in a normal use position of the container, the body defines horizontal length and breadth dimensions and a vertical height dimension, and the body includes:

a base extending in the length and breadth dimensions and defining a floor of an interior space of the body;

a roof spaced apart from the base in the height dimension and extending in the length dimension between a first end and a second end of the body; and a first sidewall and a second sidewall spaced apart from each other in the breadth dimension, each of the sidewalls extending in the length dimension between the first end and the second end of the body, and each of the sidewalls extending in the height dimension between the base and the roof;

the method further comprising:

arranging the generator within the interior space of the body to exhaust cooling air via a first aperture at the first end or the first sidewall of the body;

pivotably connecting the first doors to the body for pivotal movement between a closed position and an open position, wherein, in the closed position, the first doors close the first aperture, and in the open position, the first doors extend outwardly on either side of the first aperture in the length dimension or in the breadth dimension away from one of the first end and the first sidewall of the body;

mounting a movable wall in a wall mounted position between the first doors in the open position, to define an upwardly open exhaust air duct external to the body between the movable wall, the doors, and the first end or the first sidewall of the body, providing a base panel in the upwardly open exhaust air duct, the base panel being movably mountable in a base mounted position to close a lower end of the exhaust air duct, the base mounted position is arranged to slope downwardly and outwardly away from the body in the normal use position of the container and the base panel configured to drain rain away from the body;

the exhaust air duct extending in the height dimension from a lower end region of the movable wall to an upper end region of the movable wall for a height of the body, the movable wall being spaced apart from the body by the first doors from the lower end region to the upper end region in the wall mounted position; and discharging the exhausted cooling air upwardly from an upper end of the exhaust air duct.

* * * * *